United States Patent [19]

Gyurovits

[11] Patent Number: 4,557,464
[45] Date of Patent: Dec. 10, 1985

[54] PLUG TYPE FAUCET VALVE

[76] Inventor: John S. Gyurovits, 20 Jay Rd., Chatham Township, Morris County, N.J. 07928

[21] Appl. No.: 716,547

[22] Filed: Mar. 27, 1985

[51] Int. Cl.$^4$ ............................................. F16K 51/00
[52] U.S. Cl. ..................................... 251/287; 251/172; 251/184; 251/310; 251/312
[58] Field of Search ............... 251/171, 172, 170, 175, 251/184, 287, 310, 312

[56] References Cited

U.S. PATENT DOCUMENTS

| | | | |
|---|---|---|---|
| 3,350,057 | 10/1967 | Luckenbill | 251/312 |
| 3,677,516 | 7/1972 | Hicks | 251/185 X |
| 3,913,612 | 10/1975 | Toluai | 251/172 |
| 3,923,284 | 12/1975 | Stickler | 251/172 |
| 4,088,302 | 5/1978 | Williams | 251/172 X |

Primary Examiner—Harold W. Weakley

[57] ABSTRACT

This new plug type faucet valve assembly of the present invention particularly adapted for use in plumbing fixtures, for dispensing and, or mixing hot or cold water into lavatory sinks, vessel and the like, herein being disclosed. The preferred embodiment comprises a generally cylindrical body, having a vertical inlet port eccentrically placed from the bottom extending upward into a central cavity, and a horizontal discharge port through the side wall, wherein said ports are being interconnected at a right angle, by two intersecting blind bores in a cylindrical plug rotatably disposed therein to form a passageway through the faucet valve. Said plug comprise seals circumferentially disposed in respective grooves thereon, and having a trust bearing plate sealably co-acting with the inlet port seal at the bottom of said cavity, to protectively separate the planar surfaces of said plug and said cavity, forming a leak-proof connection therebetween. When rotating said plug between a fully open and closed position, said ports are apertured, causing cross-sectional changes in said passageway and restricting the flow of aqueous liquids into said discharge port therethrough.

6 Claims, 3 Drawing Figures

PLUG TYPE FAUCET VALVE

BACKGROUND OF THE INVENTION

The present invention relates to washerless type faucet valves, that are commonly used for household plumbing, dispensing and mixing hot and cold water into the kitchen or lavatory sinks, vessels, garden equipment and the like. Heretofore, washerless faucet valves of the prior art conveniently employing slidably displaced integral elements and others intertubular components for cross-sectional opening control, which are requiring extensive machining operations, and involves the use of complex assembly procedures and special tools. There are types of faucet valves in use, wherein specially engineered precision molded components in combination with spiral spring, employed directly within the flow path of the passing fluid causing entire component erosion and failure. In known devices of this kind, employing said components due to inherent problems such as component erosion and sediment build up from the hot water system, requiring periodic maintenance and repair. And many of times these repairs entail replacement of engineered component that is available through distributors only, and is requiring the necessary skill and special tools, which by itself is an added demand, inconvenience and expense for the consumer.

SUMMARY OF THE INVENTION

It is an object of the present invention to provide a new and useful valve device for dispensing, and or mixing hot or cold water into lavatory sinks, vessels, accessories and the like, that overcome the disadvantages of the prior art.

A specific object of the invention is to provide a device in which the number of moving parts are reduced to a minimum without impeding the intended functioning and the overall reliability of said faucet valve.

Another object of the invention is to provide a faucet valve that is economical and simple in construction, and can be manufactured without the use of specialized precision tooling or molds, requiring only minimal standard machining operations and simple assembly methods, and yet provide long, quiet and trouble-free service life under customary operating conditions.

And yet another object of the invention is to provide a faucet valve that is easily serviceable by persons untrained in the plumbing trade without the use of special tools, and wherein only commercially marketed sealing means are utilized, providing the user with easy access to a variety of sources where wearing service parts can be obtained conveniently at competitive prices.

Other objects and advantages of the invention will be apparent from the following detailed description of the preferred embodiment when read in conjunction with the accompanying drawing and novel features will be pointed out hereinafter in the claims.

BRIEF DESCRIPTION OF THE DRAWINGS

This invention is illustrated in the accompanying drawings in which.

DETAILED DESCRIPTION OF THE PREFERRED EMBODIMENT

Figure 1:
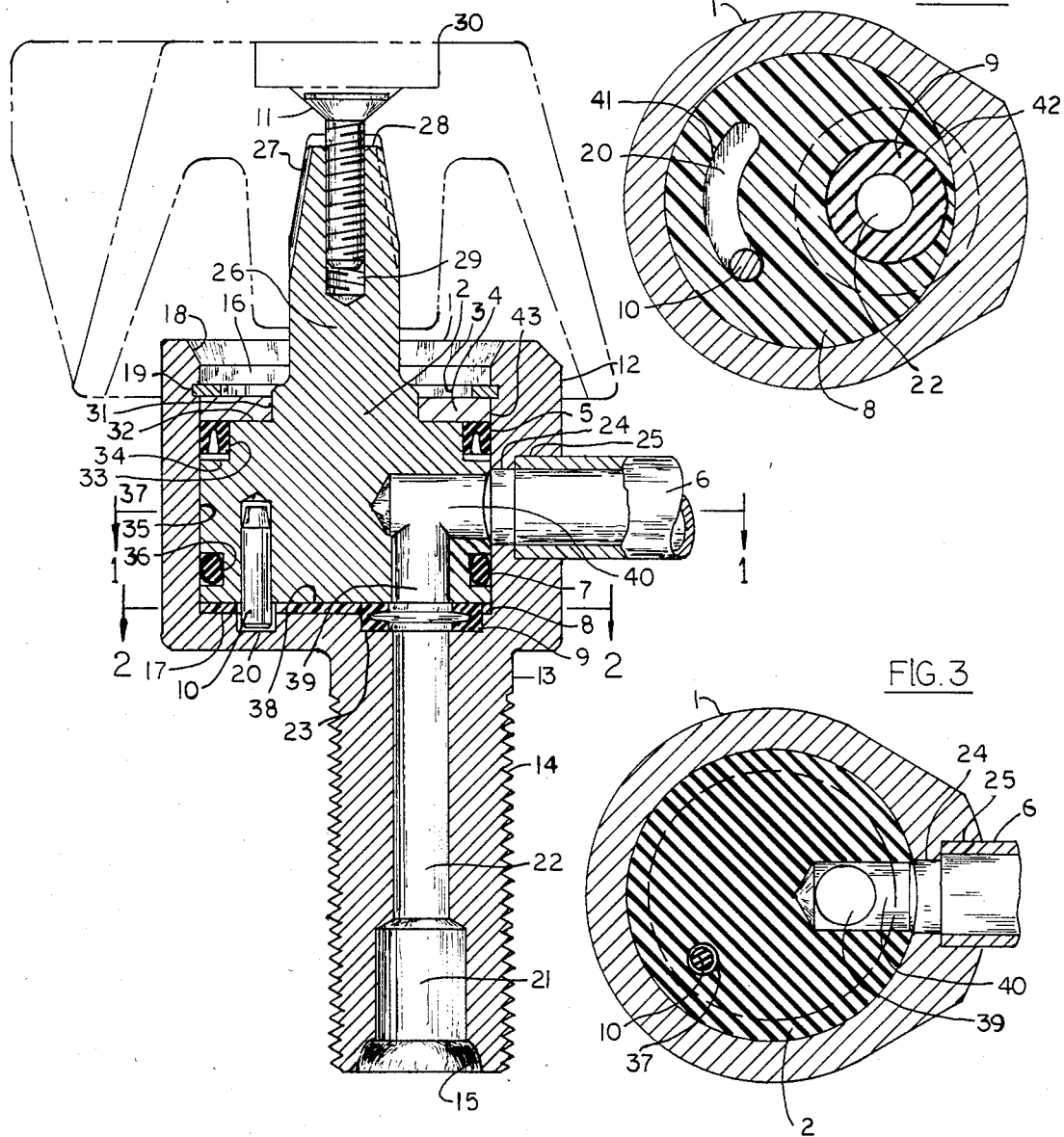
FIG. 1 is an axial sectional view of the preferred embodiment of the plug type washerless faucet valve in the open position.

While the various features of this invention are hereinafter described and illustrated as being particularly adapted to provide a control device for hot or cold water when mounted onto a vessel, sink, lavatory, or any other receptacle or equipment, where controlling the flow of aqueous liquids is desired. It is to be understood that the various features of this invention can be utilized singly or in combination thereof to provide control device for other apparatus as desired.

Therefore, this invention is not to be limited to only the embodiments illustrated in the drawings, because the drawings are merely utilized to illustrate some of the wide variety of uses of this invention.

Figure 2:
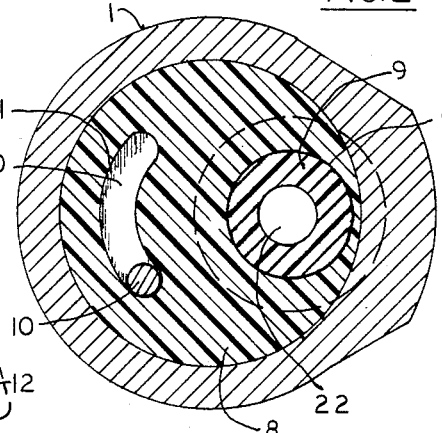
FIG. 2 is a top plan view taken along line 2—2 of FIG. 1.
Figure 3:
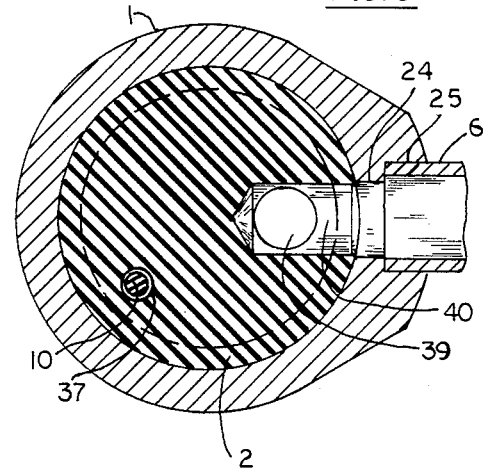
FIG. 3 is a similar view to FIG. 2, taken along line 1—1 of FIG. 1.

The following components are, as it is arranged in this drawing from FIG. 1 through FIG. 3 of the preferred embodiment of this invention to clearly illustrate the operating principle of this novel faucet valve assembly, in which like numberals indicate like components, where Nos. 1 is the encasement body, 2 plug, (the novel plug valve member) 3 retainer ring, 4 trust washer, 5 top seal ring, 6 connecting spout, 7 lower seal ring, 8 trust bearing, 9 inlet port seal, 10 stop, 11 screw, and the phantom lines outline the handle.

Referring to the novel faucet valve assembly of this invention as shown in elevation in FIG. 1, there is provided an encasement body 1, generally having rounded upper part 12, and a mounting stem 13 that is the lower part of the encasement body 1, located off center at the bottom of part 12, having reduced diameter and external thread 14 thereon to facilitate mounting, and an inlet connection 15 for hot or cold water. Centrally located in the upper part 12 is a straight bore 16 with planar surface for bottom 17, at the top of bore 16 is a chamfer 18 under which a radially cut groove 19 is made into the inside wall of the bore 16 to house retainer ring 3. A plug travel limiting groove 20 is radially cut into surface 17 having sufficient clearance for stop 10. From the inlet port connection 15 a relief bore 21 provides clearance for tubing, when such connection is desired, (not shown) the inlet passageway 22 is a smaller hole than bore 21, and is extending from bore 21, through the center of stem 13 to counter bore 23 that is cut into surface 17 coaxially to passageway 22 to house inlet port seal 9. Located approximately halfway between surface 17 and groove 19 through the wall of upper part 12, where the radius when extended from the center of passageway 22 to the wall of bore 16 is the shortest, and is right angle to, and approximately the same size diameter as 22, located discharge port 24 to which counter bore 25 is coaxially made to receive connecting spout 6. The plug 2 as shown in FIG. 1 having a stem 26 with tapered serration 27 to the apex 28 where centrally located a blind hole 29 that is threaded for screw 11 to hold handle 30 (shown in phantom line only) securely in place. From the bottom of stem 26 a larger diameter journal 31 ends in a shoulder 32 than extends yet another diameteral step 33 which together with surface 34 forms a part of the housing for upper seal ring 5. Into the outside diameter 35 of plug 2, a circumferentially cut groove 36 is located to house lower seal ring 7, a blind hole 37 (FIGS. 1 and 3) is placed eccentrically into the planar surface 38, inlet port 39 is a blind hole positioned coaxially to, and is the same diameter as passageway 22, on diameter 35 between surface 34 of seal ring 5 and groove 36 of seal ring 7, the inlet port 39 is interconnected at right angle by the slightly larger diameter outlet port 40 (FIGS. 1 and 3) which is so positioned that when stop 10 is at the end of groove 20 shown counterclockwise (FIG. 2) the outlet port 40 (FIGS. 1 and 3) is coaxially aligned with discharge port 24, then this novel faucet valve is in fully open position as shown in FIG. 1. Trust bearing 8 is made of synthetic resin material and is cut to the same diameter as bore 16, the slot 41 is to correspond in position to groove 20 in surface 17, when the round perforation 42 is coaxially positioned to and is the same size in diameter as counter bore 23 and seal 9. (FIGS. 1 and 3)

As described and illustrated herein, the present invention what is believed to be an improved faucet valve assembly, that is comprised of the novel plug valve member 2, together with top seal ring 5 and lower seal ring 7 assembled thereon and stop 10 is being inserted into hole 37, to complete this sub-assembly, and is slidably assembled into bore 16 atop of trust bearing 8 and inlet port seal 9, so that stop 10 protruding from surface 38 and through slot 41 of bearing 8 (FIGS. 1 and 2) into groove 20. The trust washer 4 slidably engaging plug 2 at journal 31 and surface 32 against the wall 43 of bore 16, and inward force is maintained on trust washer 4 by the dished spring type retainer ring 3, that is removably locked into groove 19. When this new faucet valve is in fully open position as shown in FIGS. 1 and 3, it provides an unobstructed passageway for the liquids to flow through the valve assembly from the inlet connection 15 through relief bore 21, passageway 22, inlet port seal 9 into inlet port 39 and then into the interconnecting outlet port 40 of plug 2, and out through the discharge port 24 and connecting spout 6. Back pressure that is created in the valve assembly is equal to the combined resistance to the flow upstream from discharge port 24, provides an additional force on the lower seal ring 7, and against top seal 5 as well as against the surface 34 and is forcing plug 2 more tightly against the trust bearing 8 and inlet port seal 9. When plug 2 is rotated clockwise from open toward closed position, the inlet port 39 of plug 2 is apertured by bisecting the contoured lip of inlet port seal 9, and when said plug is rotated clockwise to a full stop, and stop 10 is against the end of groove 20, then surface 38 of plug 2 is blocking the flow from entering port 39, therefore, the full force of the inlet pressure is then being applied to further energize seal 9, and provides for a more leakproof closure between the contacting components, surface 38, seal 9 and counter bore 23.

Having thus completely and fully described the invention, what is now claimed as new, and desire to secured by Letters Patent is as follows:

1. The plug type faucet valve for mixing and dispensing hot or cold water, comprising a generally cylindrical body having an inlet port eccentrically located and extending upward through the center of mounting stem where a central cavity having cylindrical inner peripheral surface extending inwardly defined by a planar surface at the bottom wherein a counter bore coaxially spaced to inlet port connecting said cavity thereto, further comprising protective trust bearing means having diameter same as said planar surface and a perforation corresponding to the diameter of said counter bore to receive said inlet seal means therein, also comprise plug valve member having diameter rotatably matched to said cavity and corresponding planar surface at the inner end, and a groove circumferentially cut at the lower end of said diameter to house lower seal therein, said diameter is reduced to provide space for upper seal means thereon, and is further reduced and journaled at the top to provide bearing surfaces for closure means slidably secured thereon, also having a vertical bore extending upward and is spaced to coaxially correspond to said inlet port at the planar surface and a bore radially spaced between said seal means on said diameter extending inward and intersecting said vertical bore therein, forming a passageway through said plug into the coaxially corresponding discharge port through the wall of said cavity.

2. The plug type faucet valve as claimed in claim 1 wherein, said upper bearing means forming a part of the housing for the upper seal means and providing reaction surface thereto, while rotatably securing said plug in said cavity against said protective trust bearing and said inlet seal means therein.

3. The plug type faucet valve as claimed in claim 1 wherein, said planar surface of said plug having a stop protruding downward through said protective trust bearing means into a radially spaced groove angularly cut into said planar surface of said cavity defining rotational limits of said plug therein.

4. The plug type faucet valve as claimed in claim 1 wherein, plug valve member having diametrical cross-sectional differential between loading surfaces of said radial seal means where dynamic force is acting upon when pressure is present therein, exerting inward force upon said plug.

5. The plug type faucet valve as claimed in claim 4 wherein, said protective trust bearing means co-acting with inlet seal means to protectively seal said planar surfaces therein.

6. The plug type faucet valve as claimed in claim 5 wherein, an inlet seal means housed in a counter bore coaxially located to inlet port at the bottom planar surface of said cavity, providing leak-proof seal between sliding planar surface of plug and said cavity.

* * * * *